United States Patent [19]

Hoaglen

[11] 4,446,926
[45] May 8, 1984

[54] MULTIPLE UNIT AGRICULTURAL DEVICE AND TRANSPORT SYSTEM THEREFOR

[76] Inventor: Milford D. Hoaglen, 836 Logan Ave., Grant, Nebr. 69140

[21] Appl. No.: 291,972

[22] Filed: Aug. 11, 1981

[51] Int. Cl.³ ............................................. A01B 73/00
[52] U.S. Cl. .................................... 172/240; 172/625; 172/677; 280/415 R
[58] Field of Search ............... 172/240, 248, 310, 311, 172/413, 414, 418, 466, 483, 625, 677; 280/43.23, 415 R

[56] References Cited

U.S. PATENT DOCUMENTS

| | | | |
|---|---|---|---|
| 2,595,277 | 5/1952 | Mathias | 172/418 X |
| 3,110,973 | 11/1963 | Reynolds | 172/414 X |
| 3,610,661 | 10/1971 | Pierce et al. | 280/415 R |
| 3,954,144 | 5/1976 | Blair | 172/311 |
| 4,127,283 | 11/1978 | Baden | 172/625 X |
| 4,157,735 | 6/1979 | Olsson et al. | 172/240 |
| 4,202,562 | 5/1980 | Sorenson | 280/415 R |
| 4,260,172 | 4/1981 | Rettig et al. | 172/240 X |
| 4,340,239 | 7/1982 | Shoup | 172/625 X |

OTHER PUBLICATIONS

"Apollo Hydraulic Transport System", a brochure from Apollo Distributing Corp., Bismarck, N.D. 58501.

Primary Examiner—Richard T. Stouffer
Attorney, Agent, or Firm—Zarley, McKee, Thomte, Voorhees & Sease

[57] ABSTRACT

A transport device for an agricultural drill is disclosed. Individually mounted, hydraulically actuated transport wheels are described. The transport wheels may be lowered in order to raise the drill to allow movement in a direction perpendicular to the ordinary operating direction of the drill. A mounting system for the wheels which absorbs shocks along three axes is described. Co-action between a coupling device and a hitch device which allows the drill to be transported over uneven ground is also disclosed.

17 Claims, 11 Drawing Figures

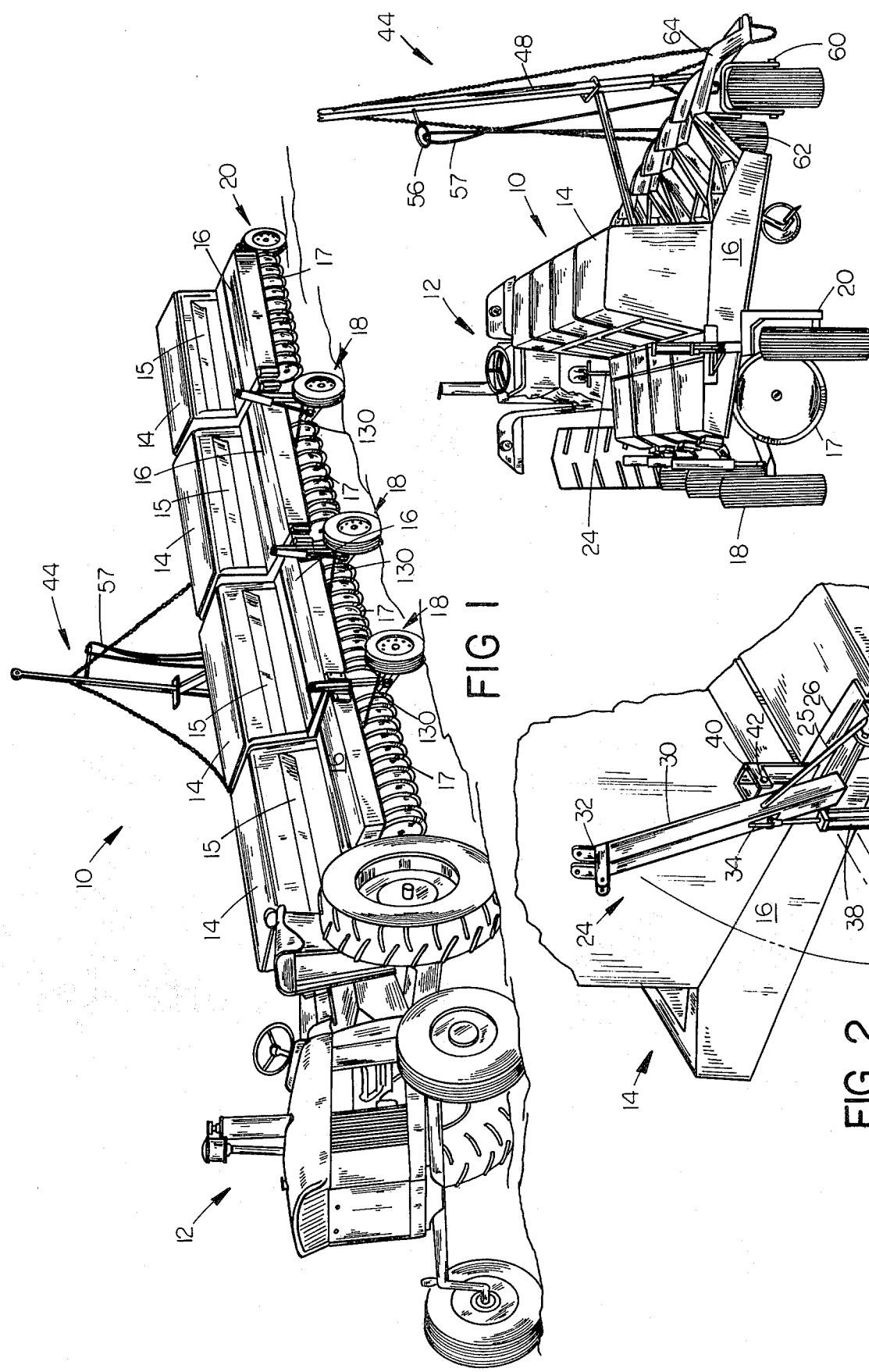
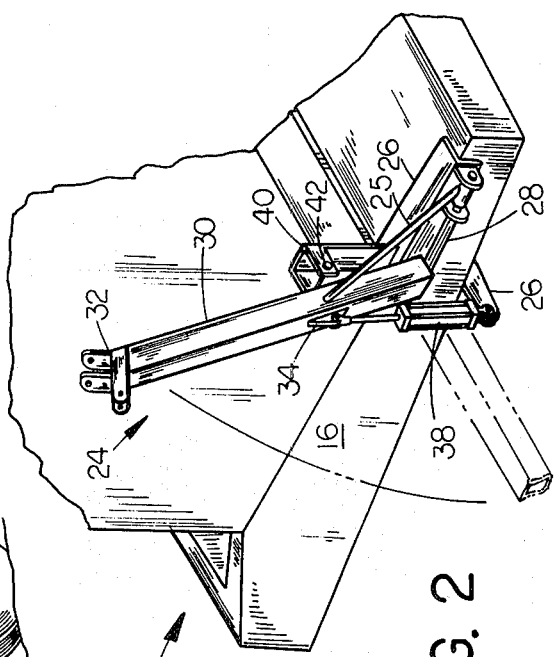

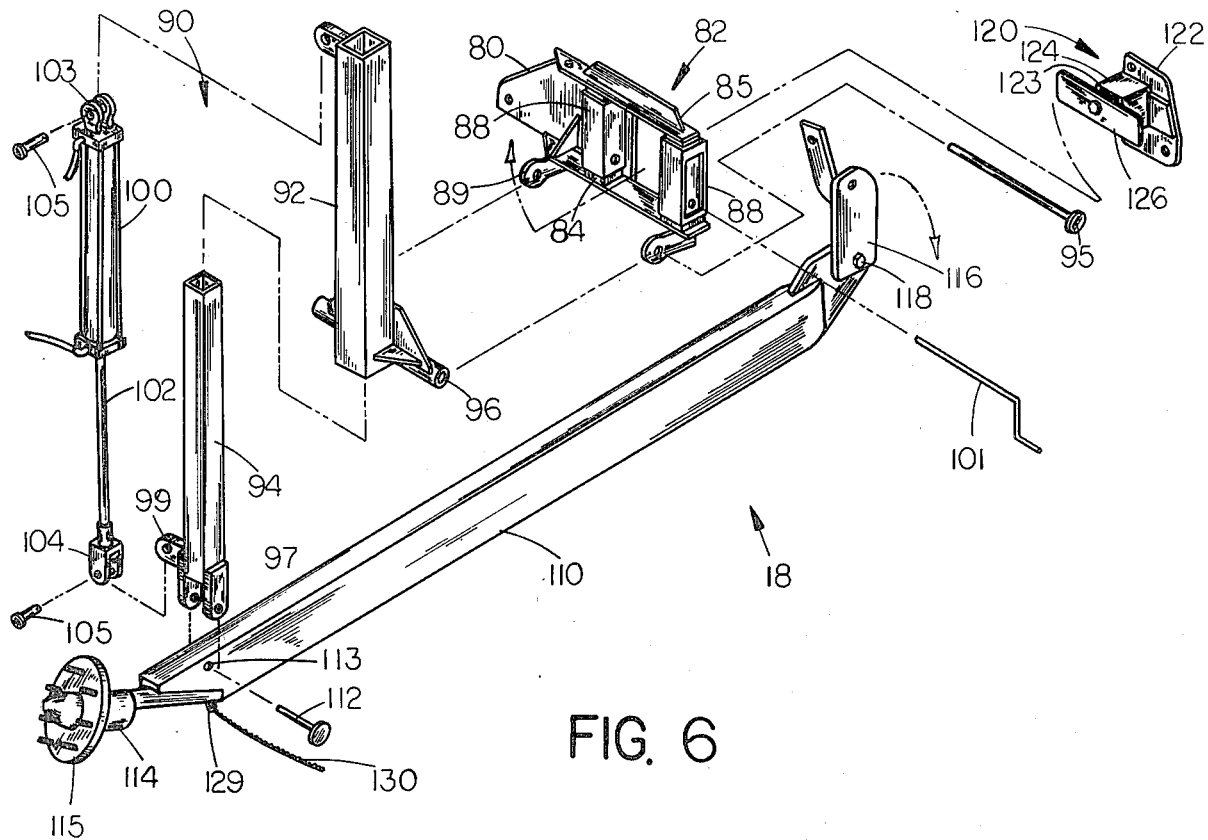
FIG. 6
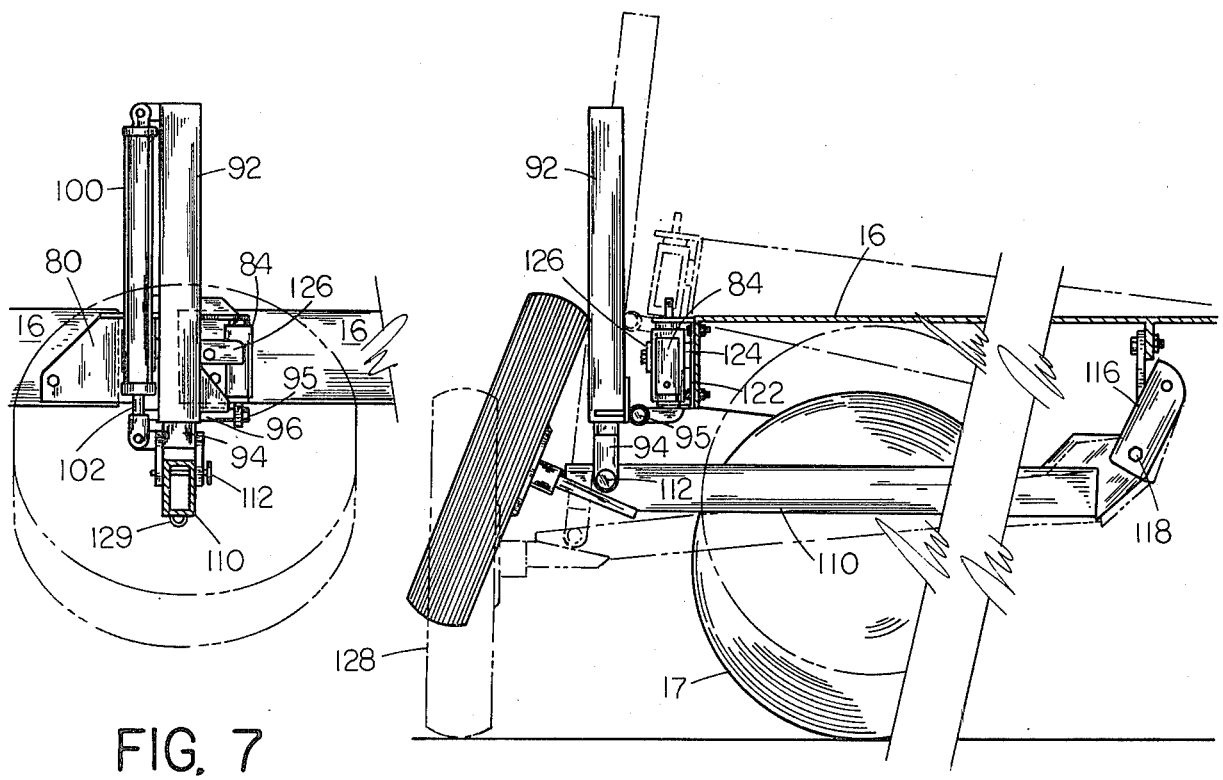
FIG. 7
FIG. 8

MULTIPLE UNIT AGRICULTURAL DEVICE AND TRANSPORT SYSTEM THEREFOR

BACKGROUND OF THE INVENTION

The present invention relates generally to transport devices used with agricultural machinery and more particularly to transport devices for grain drills.

As with most agricultural machinery designed to be pulled by a tractor, a conventional grain drill has its longer dimension oriented perpendicular to the direction of operational movement. For descriptive purposes the longer axis of a grain drill is hereinafter referred to as the longitudinal axis and the shorter axis, which is parallel to the direction of plowing, is referred to as the transverse axis. Often a number of grain drill units are connected lengthwise for the purpose of increasing the amount of ground treated in a plowing pass. When units are interlinked, the length to width ratio of the apparatus being pulled is greatly accentuated.

Most grain drills have a row of openers for piercing the ground and opening a furrow, followed by a row of press wheels which close the furrow after the grain has been deposited. The press wheels have a fixed common axis oriented parallel to the longitudinal axis of the apparatus which allows the wheels to roll in the direction of plowing.

During typical farming operations, it is often necessary to move a grain drill apparatus from field to field or along the roadway between fields. Because of length of the apparatus, it must be transported in a direction perpendicular to the direction of plowing movement operations. To avoid damage to the press wheels during transport, it is necessary to elevate the drill press and provide longitudinally oriented transport wheels. A number of devices have been used to accomplish this result with varying degrees of success. Most transport devices utilize a heavy wheel mounted frame attached about the periphery of the drill. The frame may be lowered with respect to the drill, thereby raising the drill to accomodate transport. Several problems arise with this type of transport device, especially when used with multiple unit drills. The transport frame is expensive to produce and also adds a considerable amount of weight to the drill press. This added weight changes the operating characteristics of the drill press, which may render it unusable in wet fields. Another problem with the frame type structure occurs because the drills must often be pulled over irregular ground, such as road ditches and terraces. A long rigid frame, when encountering such obstacles, tends to twist and bend and may also cause the drill press to become high centered. Thus, a more flexible transport device is desirable.

Another means of providing transport has been to use transport wheels which are mounted directly on the drill press housing. Such devices avoid part of the weight problem encountered with a transport frame apparatus, but experience problems with structural integrity. In devices now available, each transport wheel is generally extended on a single, pivoting arm that is attached to a heavy mounting framework which must be added to the drill press. Such mounting has proved to be unsatisfactory due to the stresses experienced by the wheels during normal transport operations. Because of the extreme length of most drill press devices, wheels experience a side thrust directed perpendicular to the path of longitudinal travel whenever the apparatus is forced to make a short radius turn. This side thrust tends to bend and displace the transport wheel mounting. A similar effect is produced by longitudinal forces on the wheel which are encountered when the wheel falls into a chuck hole or the like. A problem also arises from vibrations set up in the pivot arm which acts as a lever and causes bending and metal fatigue in the mounting framework and drill frame. Finally, a problem with high centering, similar to that experienced with a rigid transport frame is also experienced with housing mounted transport wheels since with present inventions, the individual grain units are prevented from flexing by the field hitch while in the transport mode.

It can therefore be seen that a need exists for a grain drill transport device which is light in weight and which allows a degree of vertical and rolling displacement between individual drill units to accomodate transportation over irregular ground. The device should be capable of sustaining longitudinal and transverse forces experienced by the transport wheels without bending or deformation. The device should also be capable of being quickly deployed to save operating time.

SUMMARY OF THE INVENTION

The present invention deals with hydraulically operated transport wheels which may be attached directly to the frame of a grain drill carriage. Each of the transport wheels are mounted on a transverse spindle arm which is capable of absorbing side thrust and eliminates prying and bending on the drill frame. Telescoping vertical arms equipped with hydraulic ram units are used to raise and lower the wheels. A coupling mechanism integrally formed with each transport wheel mounting bracket coacts with an operational hitch to provide flexing and a degree of freeplay between the carriages while they are being transported. Accordingly, it is an object of the present invention to provide a transport device which utilizes individually mounted transport wheels.

It is another object of the invention to provide a transport device which utilizes a transverse spindle arm.

It is another object of the invention to provide a transport device which utilizes a telescoping vertical arm in combination with a ram unit.

It is another object of the invention to provide a transport device which utilizes a coupling device for providing three dimensional freeplay between drill units.

It is another object of the invention to provide a transport device which utilizes a rear castor wheel.

It is another object of the invention to provide a transport device which is capable of locking a transport wheel against the telescoping arm in the "up" position.

It is another object of the invention to provide a transport device which allows a telescoping arm to be locked up or down with safety pins.

It is another object of the invention to provide a transport device which utilizes a field hitch with a spreader device which may be pivoted to provide freeplay between drill units in either the vertical or horizontal plane.

It is another object of the invention to provide a transport device which utilizes a spreader device to separate drill units to prevent wear on the frames during transport or field operation.

It is another object of the invention to provide a transport device which utilizes a field hitch with a telescoping tongue.

It is another object of the invention to provide a transport device which provides relative longitudinal motion between drill units.

It is another object of the invention to provide a transport device which is light in weight.

It is another object of the invention to provide a transport device which is relatively inexpensive to produce.

It is another object of the invention to provide a transport device which is safe to operate.

It is another object of the invention to provide a transport device which reduces loss of operating time.

It is another object of the invention to proviee a transport device with transport wheels that may be raised and lowered manually and locked into position during transport.

It is another object of the invention to provide a transport device which utilizes a limited rotation castor wheel to be placed at the front and rear extremities of the equipment in place of rigid transport wheels when large numbers of units are to be transported.

BRIEF DESCRIPTION OF THE DRAWINGS

FIG. 1 is a perspective elevation view of an agricultural drill equipped with transport wheels.

FIG. 2 is a perspective elevation view of a transport hitch.

FIG. 3 is a perspective elevation view of an agricultural drill equipped with transport wheels.

FIG. 6 is an exploded perspective view of a transport wheel unit.

FIG. 7 is an elevation view of a transport wheel unit.

FIG. 8 is another elevation view of a transport wheel unit.

FIG. 9 is a perspective elevation view of a trail wheel unit.

FIG. 10 is another perspective elevation view of a trail wheel unit.

DESCRIPTION OF THE PREFERRED EMBODIMENTS

Figure 5:
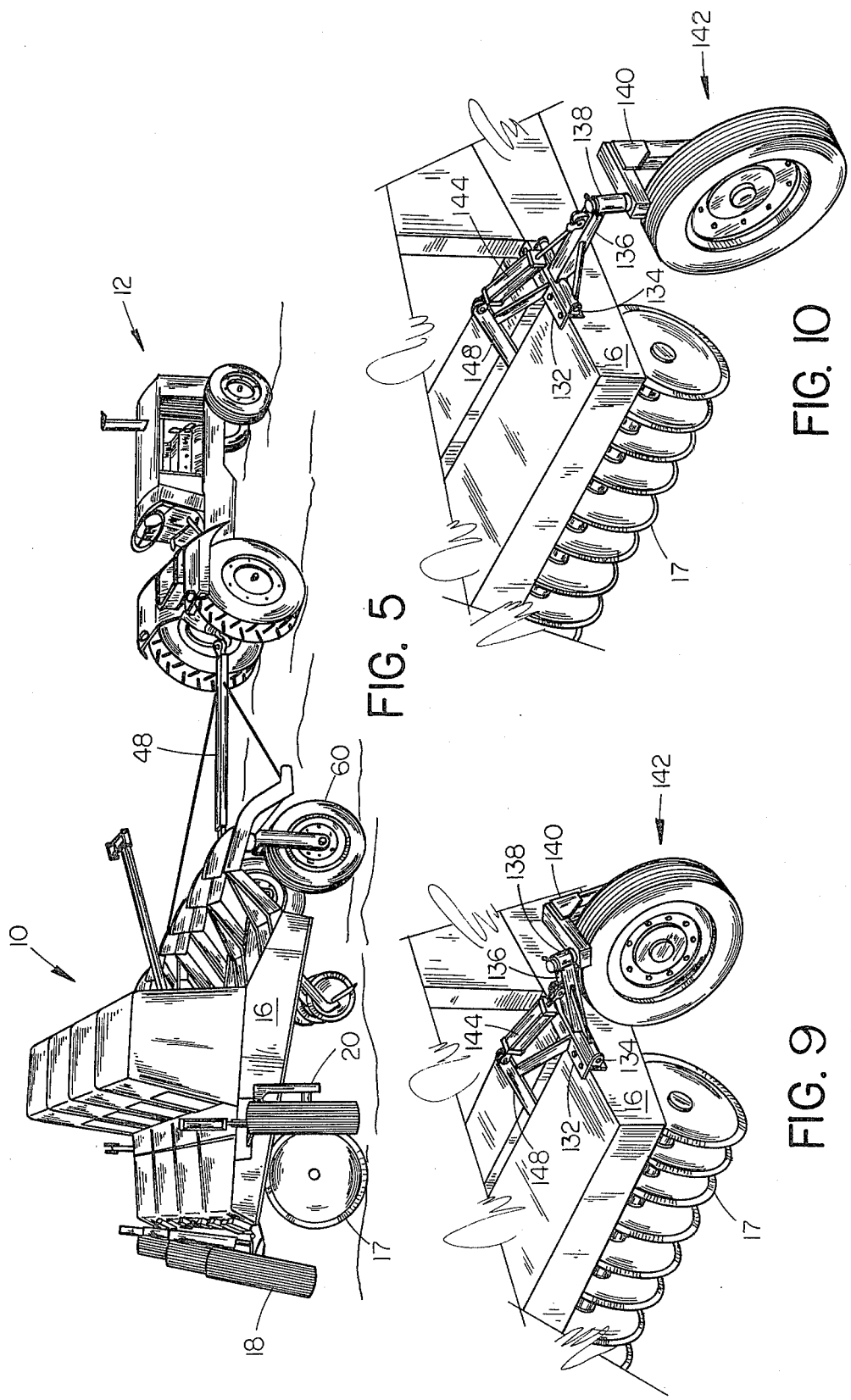
FIG. 5 is an elevation perspective view of an agricultural drill.

As shown by FIG. 1, an agricultural drill press 10 may include a number of longitudinally connected drill units 14. Each unit has a generally rectangular structural frame 16 which supports a grain box 15. A row of press wheels 17 are mounted on a common longitudinal axis below the frame 16. A set of operating wheels 60 are mounted on the operating side of the drill 10 with support members 62. The operating wheels 60 are castor wheels which may pivot longitudinally for transport, as shown in FIG. 3, or transversely for field operation, as shown in FIG. 5. A row of "openers" 15 such as plow disks, hoe or shoes are mounted between the press wheels 17 and operating wheels 60. As may be seen from FIG. 5, during normal field operations the weight of the drill 10 rests on the press wheels 17 and to a lesser extent on the operating wheels 60. As shown by FIGS. 1 and 3, during transport, transport wheel units 18 are extended to elevate the drill 10 and press wheels 17 several inches above the ground thereby allowing the drill 10 to be transported longitudinally by a farm tractor 12 or other pulling device.

The tractor 12 is coupled to the forward most drill unit 14 by a transport hitch 24 which allows the forward end of that drill unit 14 to be elevated to a proper transport height and carried by the tractor 12. As shown by FIG. 2, the transport hitch 24 is mounted to the frame 16 by means of a mounting plate 26 bolted, welded or otherwise rigidly attached thereto. A pivot arm 30 constructed from steel bar is pivotally attached to the mounting plate 26 by means of a pivot pin 28 thereby allowing the pivot arm 30 to swing in a plane parallel to the longitudinal axis of the drill 10. A hydraulic ram unit 38 is pivotally attached to the frame 16 below the pivot arm 30 by means of an attachment plate 36. The extension arm of the ram is pivotally attached near the midpoint of the pivot arm 30 by a second connector plate 34. The ram unit 38 is operated with fluid from hydraulic lines (not shown) attached to the hydraulic unit of the tractor 12. Thus, it may be seen that actuation of the hydraulic ram unit 38 will cause the pivot arm 30 to be rotated in a desired upward or downward direction about its axis of rotation. A clevis attachment 32 allows the hitch 24 to be pinned to the clevis ring (not shown) of the tractor. Once the hitch 24 is attached to the tractor 12, it will be seen that a downward movement of the hitch 24 with respect to its axis will cause the front end of the drill unit 14 to be elevated and vice versa. The ram unit 38 may be unpinned from its lower connector plate 36 in order to allow the pivot arm to be rotated to a vertical position for improved clearance during field operations. A keeper bracket 40 may be provided with a keeper pin 42 for the purpose of holding the pivot arm 30 in a vertical position.

A trail wheel 42 serves a function similar to that of the transfer hitch 24. The trail wheel 142 is used to elevate the aft end of the aft most drill unit 14 during transport. As shown by FIGS. 9 and 10, a trail wheel attachment plate 132 is bolted, welded or otherwise rigidly attached to the aft side of the frame 16. A pivot arm 136 is attached to the mounting plate 132 by means of a pivot pin 134 which allows the pivot arm 136 to move in a plane parallel to the longitudinal axis of the drill 10. A ram unit 144 is attached between the pivot arm 136 and a mounting arm 148 which is in turn rigidly attached to the drill frame 16. A castor wheel unit 140 mounted in a socket 138 at the free end of the pivot arm 136 may thus be raised or lowered with respect to the drill frame 16 by actuation of the ram unit 144. It may be seen that once the trail wheel 142 has contacted the ground, further extension of the ram unit 144 will cause the aft end of the frame 16 to be elevated as shown in FIG. 10. During field operations, as shown by FIG. 9, the ram unit is retracted, thereby elevating the trail wheel 142 above the ground. Pivot pin 134 may be removed to allow the trail wheel 142 to be removed or swung up onto the frame and out of the way for close clearance during field operation.

Construction and operation of the transport wheel unit 18 will now be described. As shown in FIGS. 1 and 3, each transport wheel unit 18 is mounted at the aft most end on the rear side of each unit 14. As shown most cearly by FIGS. 6 and 7, an iron connection plate 80 is provided which may be bolted to the vertically extending surface of the frame 16. The connection plate 80 is welded or otherwise rigidly attached to a box frame unit 82. The box frame unit 82 has a generally rectangular opening 83 formed by an upper cross bar 85 and lower cross bar 86 which are welded or otherwise attached to two vertical iron bars 84. Each vertical bar 84 is in turn encased in a wear sleeve 88. The wear sleeves 88 are provided as a maintenance feature because of the abrasive wear on the verticl surfaces during operations, as will be more fully described below. Pivot eyelet pieces 89 are welded to the lower surface of the lower cross bar 86 and are designed to accept a removable pivot pin 95. A telescoping pivot arm 90 consists of an outer member 92 an inner member 94 and a ram unit 100. The outer member 92 has a pivot sleeve 96 welded to its lower end. The pivot sleeve 96 is designed to fit between eyelets 89 and accept pivot pin 95. The pivot axis formed by the eyelets 89 is parallel to the longitudinal axis of the drill unit 14 and thus the pivot arm 92 swings in a plane perpendicular to the direction of transport travel. The outer member 92 is tubular and adapted to accept inner member 94 at its lower end in telescoping relationship. A pivot eyelet 98 with a transverse pivot axis is mounted on the upper forward side of outer member 92. A similar eyelet piece 99 is mounted on the lower forward side of the inner member 94 directly below eyelet 98. Ram unit 100 with an extendable ram rod 102 has an upper clevis 103 which is pinned to the outer member eyelet 98 and a ram rod clevis 104 which is pinned to inner member eyelet 99. Thus, it may be seen that movement of the ram rod 102 within the ram 100 will cause a similar telescoping displacement between the outer member 92 and inner member 94. An inner member clevis 97 with a pin axis directed parallel to the longitudinal axis of the drill unit 14 is provided at the lower end of the inner member 94.

A spindle arm 110 constructed from an elongate steel member is pivotally attached to the lower surface of the aft side of the frame 116 by means of a spindle arm connector plate 116 and spindle arm pivot pin 118. The spindle arm pivot pin 118 is parallel to the longitudinal axis of the unit 14, thereby allowing the spindle arm 110 to pivot in the same plane as the telescoping pivot arm 90. A spindle 114 is journaled to the free end of the spindle arm 110 and may accept a transport wheel 128 with an axis of rotation perpendicular to the longitudinal axis of the unit 14. The spindle arm 110 may be pivotally connected to inner member clevis 97 as by a bore 113 and pivot pin 112 at a point near the spindle 114.

It may be seen with reference to FIGS. 7 and 8 that extension of the ram rod 102 within the hydraulic ram unit 100 causes the entire telescoping pivot arm 90 to become extended. Because the spindle arm 110 is constrained to move in a circular arc about its pivot axis 118, the lower end of the telescoping arm 90, which is pivotally connected to the spindle arm 110, is also constrained to follow a circular arc. The pivotal connection of the telescoping arm 90 to the connector plate 80 allows the telescoping arm to pivot to compensate for the arcuate movement of the spindle arm 110 as the telescoping arm 90 is raised or lowered. As shown by FIG. 8, once the transport wheel 128 has made contact with the ground surface, any further extensions of the telescoping arm 90 causes the frame 16 and press wheel 17 to be elevated with respect to the ground, thereby allowing transport without damage to the press wheels 17 and openers 15. It may be seen from the configuration of the structural members of the transport wheel unit 18, that any transverse stresses (such as "skipping" caused by short radius turns in a multiple unit drill 10) will be absorbed by the transverse spindle arm 110 and transmitted directly to the frame 116 without placing undue bending stress on the telescoping arm 90. In a similar manner, vertical stresses will be absorbed and transmitted to the frame 16 by the telescoping arm 90, thereby reducing bending strain on the spindle arm 110. A chain attachment eyelet 129 may be provided at the lower surface of the spindle arm 110, as shown in FIG. 6. A chain 130 attached to the eyelet 129 may then be attached to a forward surface of the frame 16, as shown in FIG. 1, for the purpose of reducing bending strain on either the spindle arm 110 or telescoping arm 90 caused by longitudinal shocks (such as those produced by striking a rock or chuck hole).

Hydraulic lines from the hydraulic pump unit on the tractor (not shown) are used to actuate each ram unit 100, thereby allowing all of the transport wheel units 18 to be extended or retracted simultaneously. Holes may be provided in the inner and outer members 92 of the telescoping arm 90, which may be fitted with a safety pin to lock the telescoping arms in a desired position as a safety feature to prevent damage to the drill in the event of ram unit 100 failure. It may be seen from FIG. 8 that when transport wheel 128 is raised for field operations, the inclination of the spool with respect to the spindle arm 110 allows the wheel 128 to to be pressed firmly against the telescoping arm 92. This contact prevents the wheel from revolving and thus may keep a person who inadvertently steps on the wheel for balance or support during loading from falling and being injured. It may also be desirable to use castor wheels in place of one or more fixed wheels 128, when more than four units 14 are ganged together to facilitate turning.

As shown by FIG. 6, a "T" unit 120 is associated with each transport wheel unit 18. "T" unit 120 is mounted on the vertical surface of the frame 16 of the drill unit 14 immediately aft of the drill unit 14 on which an associated box frame unit 82 is mounted. Each "T" unit 120 is mounted to the frame 16 with an attachment plate 122. The "T" portion of each unit 120 has a trunk member 123 which extends through the rectangular opening 93 in the box frame unit 82 and which is welded or otherwise rigidly attached to the attachment plate 122. A branch plate 126 forming the top of the "T" is aligned parallel to the vertical side of the frame 16 and retains the trunk member 123 within the rectangular opening 83 in the box unit 82. A wear sleeve 124 covers the trunk member 123 for maintenance purposes. As shown by FIG. 6, the thickness of the trunk member 123 is considerably smaller than the rectangular opening 83 in the box frame unit 82, thus allowing the "T" unit 120 a limited range of movement both vertically and longitudinally within the box frame. The trunk section 123 is also somewhat longer than the transverse dimension of the opening 83, thereby allowing the "T" unit 120 a limited range of transverse movement within the opening. Because the box frame unit 82 is connected to the forward unit and the "T" unit 120 is connected to the adjacent rearward unit 14, the two units 14 are allowed a limited range of movement with respect to one another which facilitates travel over uneven ground. A more rigid attachment piece would cause bending or straining as the units 14 move with respect to each other. The freeplay provided by the box "T" arrangement allows the units 14 to be pulled behind one another without introducing any bending stresses. A pin 101 may be inserted in holes 87 provided in the box unit 82 to restrict the amount of vertical freeplay between drill units 14 during transport.

Figure 4:
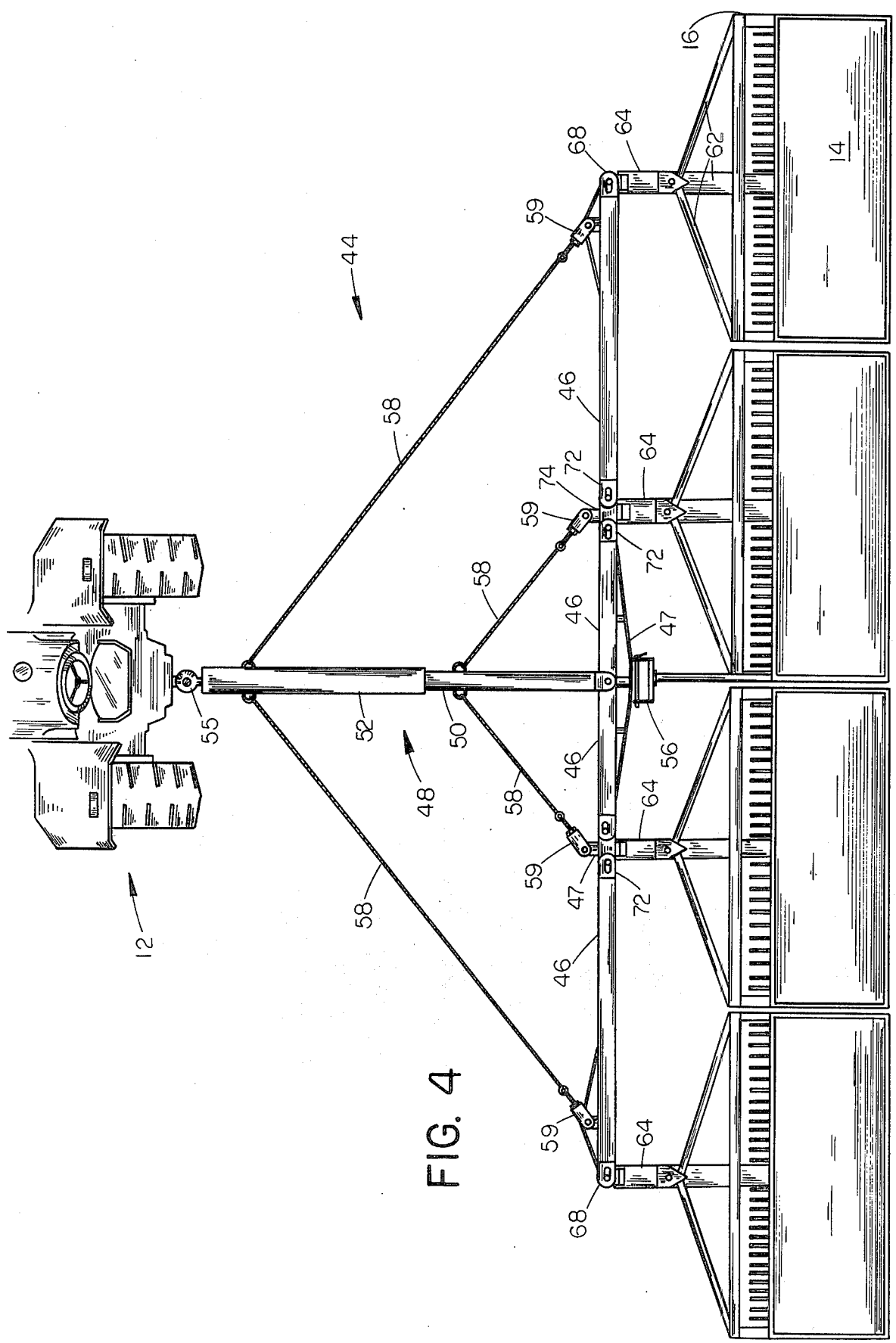
FIG. 4 is a top view of an agricultural drill with the field hitch in operational position.

The construction and function of the operating hitch 44 will now be described. It may be seen from FIGS. 3, 4 and 11 an operating hitch 44 consisting of longitudinally aligned spacer bars 46 and a transverse telescoping tongue 48 is attached to the operating side of the drill press 10. Each drill unit 14 has an associated operating wheel 60 mounted on the operating side near the longitudinal midpoint of the unit 14. Each operating wheel 60 is in turn connected to the operating hitch 44 by a connection member 64 which is attached to the upper non-pivoting surface of each wheel frame. Each spacer bar 46 is constructed from tubular iron bar or the like. For the purpose of this description, the operating hitch will be described in the field operation position as shown in FIG. 4. As will be explained below, during transport, the operating hitch is rotated 90 degrees from the field operating position. The spacer bars 46 at the outboard ends of the operating hitch 44 each have an end clevis 68 with a vertically oriented pivot axis. The inboard end of the outermost spacer bars 46 and both ends of the inner spacer bars 46 are mounted with slotted clevises 72 wherein the length of the slot is aligned with the longitudinal axis of the spacer bar 46 and the pivot axis of the slot is aligned vertically. A joiner member 74 constructed from the same material as the spacer bar has a vertical pivot axis 74 bored through each end to allow connection to the spacer bar 46 slotted clevis 72 with connection pins 66. It may be seen that the slot in the slotted clevis 72 allows fore and aft as well as rotational movement of the spacer bar 46 with respect to the joiner member 74. Each joiner member 74 has a longitudinal pivot sleeve 76 welded to one surface which allows pivotal attachment of the joiner 74 to the end of the operating wheel connection members 64 with pivot pins 66. A tab sleeve 70 allows the end clevis 68 of the outboard spacer bars 46 to be attached to the outboard most connection members 64 to provide pivotal rotation about both a vertical and longitudinal axis. Thus, it may be seen that when the operating hitch 44 is in the field operation position, the operational side of each unit 14 is coupled to each adjacent unit 14 in a manner that allows a degree of longitudinal freeplay and rotational movement with respect to other units 14 about vertical pivot axes. Tension chains 58 are provided and connected to the telescoping tongue 48 to pull the units 14 in proper longitudinal alignment; as shown by FIG. 4. For this purpose a chain joiner piece 78 is provided on the surface of each outboard spacer bar 46 and each joiner member 74. Each alignment chain 58 is equipped with a tension clevis 59. The spacer bars 46 are of sufficient length to hold the units 14 a few inches apart at a desired distance for row spacing on the operating side of the drill 10, thus preventing the units 14 from rubbing together. The chain 58 tension on each unit 14 has an inboard vector component which tends to cause the units 14 to fan out at the back. But, this fanning movement is prevented by the Box "T" 82, 120. Thus, the units 14 remain separated along their adjacent sides as they are towed and wear on the frames 16 is greatly reduced. A telescoping tongue 48 is constructed from tubular steel bar or the like and consists of a fixed bar 50 and sliding bar 52. The fixed bar 50 is pivotally attached about a vertical axis of rotation to the center joiner member 74 with an end clevis 68 and pivot pin 66. The fixed bar 50 has a series of holes 51 which may be aligned with a hole 53 in the sliding bar 52 and fitted with a pin 54 to hold the telescoping tongue 48 at the desired amount of extension. The tongue 48 is ordinarily fully extended during field operation, thereby pulling the chains 58 taut, and fully withdrawn during transport. A hose keeper 56 may be provided to hold hydraulic hoses 57. A clevis 55 or pull ring is provided at the free end of the telescoping tongue 48 for connection to a tractor 12.

Figure 11:
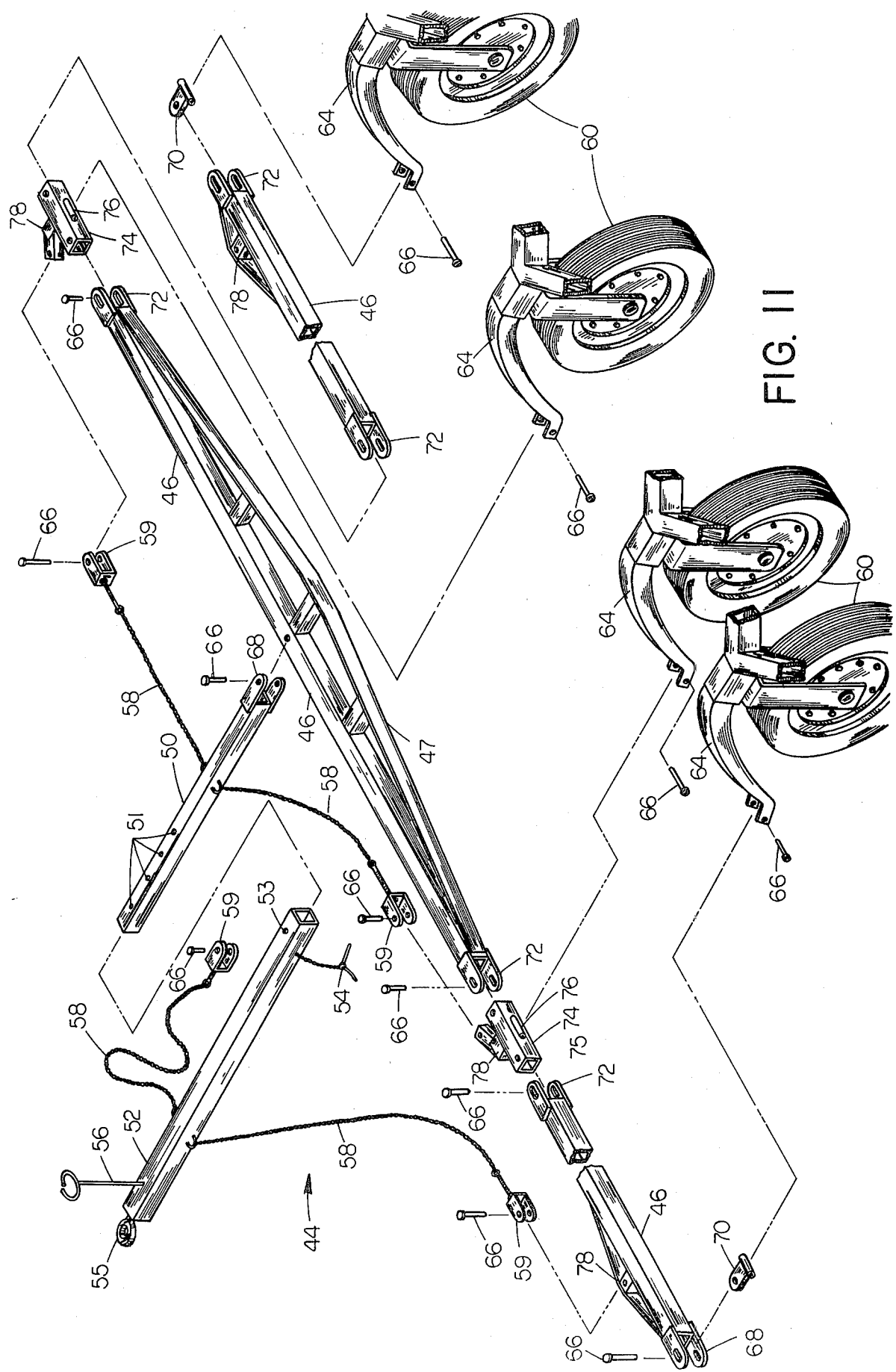
FIG. 11 is an exploded perspective view of a field operating hitch.

It may be seen from FIG. 11 that the operating hitch 44 may be rotated about its longitudinal connection axes on the outboard operating wheel connecting members 64. By rotating the operating hitch to a position where the telescoping tongue 48 is in a vertical position, it can be seen that the clevis 68, 72 axes of the spacer bars 46 have been placed in a horizontal plane and are aligned transverse to the direction of transport travel. This alignment allows the spacer bars 46 and the drill units 14 to which they are connected to float up and down with respect to each other thus facilitating longitudinal movement of the drill 10 over uneven terrain. Forward and aft freeplay provided by the slot clevis 72 also facilitates transport.

From the above it can be seen that the operating hitch 44 and the box "T" 82, 120 arrangement co-act to provide great flexibility between individual drill units 14 during longitudinal transport of the drill 10. The transport wheel units 18 co-act with the trail wheel unit 20 and transport hitch 24 to evenly elevate one side of the drill 10 to prevent damage to the drill 10 during transport. The transport wheels 18 may be quickly extended or retracted by use of the tractor's hydraulic unit. The structural configuration of each transport wheel is inherently capable of absorbing shocks in multiple directions. Because of the co-action between various system components the need for a transport frame has been eliminated.

Although specific components and steps have been stated in the above description of the preferred embodiments of the invention, other suitable materials, and process steps may be used with satisfactory results with varying degrees of quality. In addition, it will be understood that various other changes of the nature of the invention will occur to and may be made by those skilled in the art, upon the reading of this disclosure. Such changes are intended to be included within the principles and scope of this invention as claimed.

I claim:

1. In combination with longitudinally connected multiple unit agricultural equipment of a type wherein the direction of travel in the operating mode is transverse to the longitudinal axis of the equipment and the direction of travel in the transport mode is parallel to the longitudinal axis of the equipment and wherein each unit of said equipment has a frame with a generally rectangular periphery consisting of a forward side, an aft side parallel to said forward side, an operating side, and a back side parallel to said operating side; a transport device comprising:
  (a) operating hitch means connected to the operating sides of said units;
  (b) transport hitch means connected to the forward side of the forwardmost unit;
  (c) castor wheel means mounted on the operating sides of said units; and
  (d) hydraulically retractable transport wheel means mounted on the back sides of said units and each comprising (1) a hydraulic cylinder means having a first end and a second end wherein said first end is attached to the back side of the frame of an associated unit about a first pivot axis; and (2) an elongated spindle arm extending lengthwise transverse to the longitudinal axis of the associated unit, said spindle arm being mounted to said associated unit independently of the spindle arms associated with the other units, and having a first end and a second end wherein a spindle and transport wheel are mounted at said first end of said spindle arm and wherein said second end of said spindle arm is mounted about a second pivot axis attached to the frame of said associated unit and wherein said spindle arm is pivotally attached at said second end thereof to said second end of said hydraulic cylinder means about a third pivot axis; said first pivot axis, said second pivot axis and said third pivot axis being substantially parallel to the longitudinal axis of said associated unit.

2. The transport device of claim 1 wherein said retractable transport wheel means further comprises strengthening means for transmitting longitudinal shocks from said transport wheel to said frame.

3. The transport device of claim 2 wherein said strengthening means comprises a chain with a first end and a second end wherein said first end is attached to said spindle arm proximate said transport wheel and said second end is attached to said frame of said associated unit at a point forward of said spindle arm.

4. The transport device of claim 1 wherein said hydraulic cylinder means comprises a hydraulic ram unit pivotally attached to a telescoping lock arm in parallel alignment therewith.

5. The transport device in claim 1 wherein said operating hitch means comprises longitudinal spacer bar means and transverse pull bar means.

6. The transport device of claim 5 wherein said longitudinal spacer bar means comprises a plurality of elongate members joined end to end by transverse pivot connectors wherein said pivot connectors have parallel, transverse pivot axes and wherein said pivot connectors are mounted in slots in said elongate members.

7. The transport device of claim 6 wherein the forward most elongate member of said longitudinal spacer bar means is attached to the forward most unit about a forward longitudinal pivot axis and the aft most elongate member is attached to the aft most unit about an aft longitudinal pivot axis whereby said longitudinal hitch means may be rotated about a longitudinal axis when said forward longitudinal pivot axis is substantially coaxial with said aft longitudinal pivot axis.

8. The transport device of claim 7 wherein said transverse pull bar means comprises a plurality of telescopingly connected elongate sections and keeper means for selectively locking said telescoping elongate sections in fixed position relative to each other.

9. The transport device of claim 8 wherein said operating hitch means further comprises tension chains connected between said transverse spacer bar means and said units for maintaining the alignment of said units in the operating mode.

10. The transport device of claim 9 further comprising box "T" coupling means attached to the rear side of said units for freeplayingly coupling said units whereby each unit retains a limited range of longitudinal transverse and vertical motion with respect to an adjacent unit.

11. The transport device of claim 1 further comprising box-"T" coupling means attached to the rear side of said units for freeplayingly coupling said units whereby each unit retains a limited range of longitudinal, transverse and vertical motion with respect to an adjacent unit.

12. The transport device of claim 1 further comprising a retractable tail wheel mounted on the aft side of the aft most unit.

13. The transport device of claim 1 wherein said transport hitch means comprise:

(a) a hitch hydraulic cylinder having a first end and a second end wherein said first end is mounted on the forward side of the forward most unit.

(b) an elongate hitch pivot arm pivotally mounted on the forward side of the forward most unit below the pivotal attachment point of said hitch hydraulic cylinder to said unit wherein the second end of said hitch hydraulic cylinder is pivotally mounted on said elongate hitch pivot arm.

14. The transport device of claim 1 wherein said hydraulic means comprises a telescoping pivot arm including an outer member and an inner member telescopically slidable within said outer member, and a ram unit having first and second ends, the lower end of said outer member being pivotally connected to the back side of the frame of an associated unit for pivotal movement about said first pivot axis which is substantially parallel to the longitudinal axis of said associated unit, the lower end of said inner member being pivotally connected to said spindle arm about said third pivot axis which is substantially parallel to said first pivot axis, and said first end of said ram unit being connected to the upper end of said outer member and said second end of said ram unit being connected to the lower end of said inner member.

15. In combination with longitudinally connected multiple unit agricultural equipment of a type wherein the direction of travel in the operating mode is transverse to the longitudinal axis of the equipment and the direction of travel in the transport mode is parallel to the longitudinal axis of the equipment and wherein each unit of said equipment has a frame with a generally rectangular periphery consisting of a forward side, an aft side parallel to said forward side, an operating side, and a back side parallel to said operating side; a transport device comprising:

(a) operating hitch means connected to the operating sides of said units;

(b) transport hitch means connected to the forward side of the forwardmost unit;

(c) castor wheel means mounted on the operating sides of said units; and (d) hydraulically retractable transport wheel means mounted on the back sides of said units, comprising (1) a hydraulic cylinder means having a first end and a second end wherein said first end is attached to the back side of the frame of an associated unit about a first pivot axis; and (2) a spindle arm having a first end and a second end wherein a spindle and transpoprt wheel are mounted at said first end of said spindle arm and wherein said second end of said spindle arm is mounted about a second pivot axis attached to the frame of said associated unit and wherein said spindle arm is pivotally attached to said second end of said hydraulic cylinder means about a third pivot axis;

(e) box-"T" coupling means attached to the rear side of said units for freeplaying coupling said units whereby each unit retains a limited range of longitudinal, transverse and vertical motion with respect to an adjacent unit, said box-"T" coupling means comprising, (1) a rectangular coupling frame wherein the four sides of said frame are formed from metal bars whereby said bars form a rectangular enclosure wherein the longitudinal axis of said bars lie within a single plane parallel to the longitudinal axis of an associated unit;

(2) coupling frame attachment plate means for attaching said coupling frame to said associated unit;

(3) a "T"-shaped member wherein the trunk of said "T"-shaped member is positioned within said rectangular enclosure and wherein the branch of said "T"-shaped member has a longitudinal axis lying in a plane parallel to the longitudinal axis of the unit to which it is attached; and (4) "T" attachment plate means for attaching said "T"-shaped member to an associated unit.

16. The transport device of claim 15 wherein said rectangular frame is mounted at the aft end of a first unit and wherein said "T"-shaped member is mounted at the forward end of a second unit wherein said second unit is adjacent and aft of said first unit.

17. The transport device of claim 16 wherein said first pivot axis for attaching said hydraulic cylinder means to a unit frame is mounted on said coupling frame attachment plate means.

* * * * *